United States Patent [19]

Larsen

[11] Patent Number: 4,834,033
[45] Date of Patent: May 30, 1989

[54] APPARATUS AND METHOD FOR A BALANCED INTERNAL COMBUSTION ENGINE COUPLED TO A DRIVE SHAFT

[76] Inventor: Melvin J. Larsen, 3655 W. Del Rio St., Chandler, Ariz. 85226

[21] Appl. No.: 925,795

[22] Filed: Oct. 31, 1986

[51] Int. Cl.[4] ............................................. F02B 75/26
[52] U.S. Cl. ............................ 123/58 AB; 123/47 A; 123/56 C; 74/57; 74/60
[58] Field of Search .............. 123/58 R, 58 A, 58 AB, 123/47 R, 47 A, 56 B, 56 BB, 56 BC, 56 C; 74/55, 57, 60, 22 A, 27, 84 A

[56] References Cited

U.S. PATENT DOCUMENTS

| | | | |
|---|---|---|---|
| 2,301,175 | 11/1942 | Earnshaw et al. | 123/58 A |
| 2,439,265 | 4/1948 | Schroeder | 123/58 AB |
| 3,598,094 | 8/1971 | Odawaka | 123/58 R |

Primary Examiner—Henry A. Bennet
Attorney, Agent, or Firm—William W. Holloway

[57] ABSTRACT

An internal combustion engine is described in which the piston movement is parallel to the drive shaft. The engine cylinders are arranged in opposed pairs and the piston rods directly coupled so that the power stroke in one cylinder can assist with the compression stroke in the associated cylinder. The coupled or common piston rods have attached thereto a carriage that engages in a cam groove in the drive shaft. The drive shaft cam groove receives the force of the carriage as it is propelled by the pistons and the resulting torque causes a rotation of the drive shaft. The cylinders include a pre-compression chamber that assists in the exchange of combustion products with air. The internal combustion engine does not require special cooling and does not require a starter motor.

11 Claims, 5 Drawing Sheets

APPARATUS AND METHOD FOR A BALANCED INTERNAL COMBUSTION ENGINE COUPLED TO A DRIVE SHAFT

RELATED PUBLICATIONS

The following publications and U.S. Patents are documents related to the instant Application:

Transmission for Piston and Crankshaft Assemblies, invented by R. L. Bourke, having U.S. Pat. No. 2,2122,676, issued on July 5, 1938.

Internal Combustion Engine, invented by R. L. Bourke, having U.S. Pat. No. 2,122,677, issued on July 5, 1938.

Crankcase Ventilating Means, invented by R. L. Bourke, having U.S. Pat. No. 2,172,670, issued on Sept. 12, 1939.

Triple Cam Drive Gasoline Engine, invented by F. H. King, having U.S. Pat. No. 1,765,237, issued on June 17, 1930.

Power Plant and Connector for Deep Well Pumps, invented by C. R. Woods, having U.S. Pat. No. 2,818,814, issued on Jan. 7, 1958.

Reciprocating Rotary Engine, invented by Albert F. Albert, having U.S. Pat. No. 4,334,506, issued on June 15, 1982.

Reciprocating Engine, invented by Alfred J. Crocker, having U.S. Pat. No. 4,381,740, issued on May 3, 1983.

Energy Transfer Apparatus, invented by Alfred J. Crocker, having U.S. Pat. No. 4,387,672, issued on June 14, 1983.

Dyna-Cam Aircraft Engines, Catalog 10, Dyna-Cam Industries, P.O. Box 12095, Santa Ana, CA 92712 (undated). (This catalog offers for sale an engine developed in the 1940s generally referred to as a Herman engine, named after the inventor. This engine is also described in Dyna-Cam, Engine of the Future, Pacific Flyer, Aug. 1985 Pages 24A and 26A.)

BACKGROUND OF THE INVENTION

1. Field of the Invention

This invention relates generally to internal combustion engines and more particularly to internal combustion engines in which opposed pairs of cylinders have coupled or common piston rods. A novel technique for converting the reciprocating motion to rotary motion is used in the engine.

2. Description of the Related Art

It is known in the related art to position cylinders so that motion of the pistons is generally at right angles to the drive shaft. By coupling the piston rods to a crank shaft, the structure of the crank shaft permits the force exerted by the piston rod to be off center and to provide a torque on the shaft causing the crank shaft and the coupled drive shaft to rotate. The positioning of the cylinders so that the piston motion was perpendicular to the drive shaft resulted in a large engine. In addition, the crank shaft is frequently a very elaborate structure that is difficult to fabricate.

The advantages of opposing cylinder pairs, coupled together and operating 180° out of phase, has been recognized. In U.S. Pat. No. 1,765,237, a structure is coupled to the drive shaft of the engine that permits cylinder pairs, that are directly coupled, to travel over the structure while maintaining a constant distance. In another embodiment in the related art, the Bourke engine, in which cylinder pairs have pistons that are coupled together, has apparatus coupling the pistons permitting a section of a crank shaft to move freely in a direction perpendicular to the motion of the pistons. The combination of the motion of the pistons in one direction coupled with the capability of the crank shaft motion in a perpendicular direction, permits the linear motion of the pistons to be converted to circular motion of the crank shaft.

In the 1940's, an engine was developed by Karl Herman, generally referred to as the Herman engine and commercially available as the Dyna-Cam engine, that positioned coupled pistons relative to the drive shaft in a manner that the motion of the pistons was parallel to the axis of the drive shaft. The pistons were coupled to the drive shaft by providing a roller device that engaged a shaped plate cam device coupled to the drive shaft. As the coupled pistons moved back and forth as a result of combustion in the cylinder, the shaped plate cam translated the motion of the coupled pistons into a torque rotating the drive shaft. The torque and force exerted by the shaped plate on the drive shaft make configuration susceptible to failure.

A need has therefore been felt for an internal combustion engine that has at least one pair of cylinders (and having the motion of coupled piston rods) generally parallel to the axis of the drive shaft and in which the coupled or common piston rods are coupled to the drive shaft. In addition, a need was felt for cylinders that have an improved technique for replacing the gases that result from combustion within the cylinder with air.

FEATURES OF THE INVENTION

It is an object of the present invention to provide an improved internal combustion engine.

It is a feature of the present invention to provide for pairs of opposed cylinders having a piston stroke parallel to the axis of the drive shaft.

It is another feature of the present invention to provide pairs of opposed cylinders wherein the piston rods of cylinder pairs are a common structure or are coupled together.

It is yet another feature of the present invention to attach a carriage to coupled or common piston rods of associated cylinder pairs, the carriage positioned to engage a cam groove in the drive shaft.

It is a more particular feature of the present invention to provide a precompression chamber to assist in the removal of the combustion products from the upper cylinder combustion chamber and replace the products of combustion with fresh air.

It is still another feature of the present invention to provide an adiabatic type internal combustion engine that does not require special cooling.

It is yet another feature of the present invention to provide an adiabatic type internal combustion engine wherein the combustion chambers are constructed of ceramic materials.

It is a further feature of the present invention to provide a internal combustion engine that does not require a starter motor.

This engine of the present invention, having a 2-stroke mode of operation, eliminates a multiplicity of mechanisms such as valves, camshafts, lifters, springs, valve guides, air passages and cooling system, whether liquid or air, that are required in a 4-stroke engine, (such as the Dyna-Cam engine). All of these additional features and apparatus detract from the thermal and mechanical efficiency. The engine of the present invention functions on the adiabatic principle, utilizing ceramic cylinders and pistons which have low thermal conductivity but which are able to operate at very high temperatures resulting in a correspondingly high thermal efficiency when compared to conventional engines. The conventional engines waste large amounts of heat energy thru the elaborate cooling systems to avoid thermal destruction of the pistons and cylinder heads. In the engine of the present invention, all the torque reaction forces arising from the interaction with the cam are resisted by the carriage and the associated ball bushings on the guide bars. As a result, the pistons can be centered and float in the cylinders without exerting any appreciable side loads on the walls. This implementation results in very low friction and wear losses as compared to engines with more conventional configurations where the piston produces drag forces by resisting all torque reaction forces against the cylinder wall such as is found in the Dyna-Cam engine. Due to the relationship of the three stroke cam with the four pairs of axial cylinders operating on the two stroke cycle, two cylinders fire simultaneously for every 30° of drive shaft rotation. The firing cylinders are diagonally opposite each other moving toward the center of the engine. As a result, the reaction forces generally cancel each other, minimizing vibration without use of counterweights or a special counterbalance type shaft as required by conventional engines. The cam can be coupled to the output shaft thru a silicone viscous coupling, steel shot flexidyne coupling, magnetic particle coupling or similar coupling techniques. The coupling media dampens the torsional vibration resulting in relatively vibration-free, turbine-like operation. Inherent in the 3 to 1 rotation reduction between the motion of the pistons and the 2-stroke cam track with out the use of gears or belts and consequently can result in 6000 strokes per minute (generally close to optimum for a 2-stroke cylinder operation) and 2000 revolutions per minute (RPM) at the power output shaft (a generally optimum values for aircraft propeller operation). All mechanical parts move on ball or roller bearings and are spray lubricated with light oil. Because the oil is isolated from piston blow-by resulting in reduced contamination, the oil requires replacement less frequently. The piston blow-by is picked up by the following air charge from the precompression chamber and is continually being removed from the cylinder avoiding contamination of the lubricating oil. In the Dyna-Cam (Herman) engine, all the piston blow by goes directly into the cam shaft case, contaminating the lubricating oil in the same manner as for the conventional engines. The engine of the preferred embodiment operates on the standard ""diesel" free breathing and stratified charge principal using direct injection of ignited fuel. Power output is controlled by variation of the quantity of injected fuel and, therefore, no throttle or fuel mixture control is required (i.e., for different altitudes in aircraft application). Having no restricting throttle mechanism, a unique timed induction value and one or more transfer passages to the upper cylinder region results in a very "deep breathing" engine with a very high volumetric efficiency. No port openings or reed valves are required to impede the air flow. The cylinder head and piston head combination provide a unique combustion chamber which creates a miniature tornado-like air circulation into which the stratified ignited fuel spray is injected. Due to the injection of ignited fuel, the engine can be started by injecting burning fuel into whichever cylinders are on the power stroke, obviating the need for a starter motor or a heavy battery. Because lubricating oil is not used to cool the pistons or cylinder walls, a special oil cooler may not be required. Pre-ignition or detonation cannot occur because no fuel is present in the combustion chamber until the pistons are properly positioned for a power stroke. By providing anti-friction design features to insure that the pistons are free-floating within the cylinders, the drag forces, normally present in conventional engines and Dyna-Cam (Herman) engines, are greatly reduced. The result of the reduced drag forces an improvement in mechanical efficiency over conventional designs.

SUMMARY OF THE INVENTION

The aforementioned and other features are obtained, according to the present invention, by positioning at least one pair of cylinders having a common or coupled piston rod so that the motion of the piston rod is generally parallel to the axis of the drive shaft. The drive shaft has a cam groove encircling the drive shaft. Coupled to the piston rod is a carriage mechanism that is adapted, by the position of the cylinder pair to engage the groove. As the activity of the cylinders causes the piston rod to move back and forth, the carriage exerts a force on the walls of the drive shaft cam groove causing the drive shaft to rotate. By symmetrically positioning a plurality of cylinder pairs, and by symmetrically activating the cylinders, the internal forces, generated by the movement of the pistons, can be counterbalanced. Each cylinder is constructed to have a lower precompression chamber. The precompression chamber forces the exchange of the products of combustion with air in the upper cylinder combustion chamber. The combustion chambers can be constructed of ceramic materials permitting adiabatic operation and eliminating the need for special cooling. The internal combustion engine does not require an auxiliary starter motor.

These and other features of the present invention will be understood upon reading of the following description along with the drawings.

DESCRIPTION OF THE PREFERRED EMBODIMENT

1. Detailed Description of the Figures

Figures 1, 4:
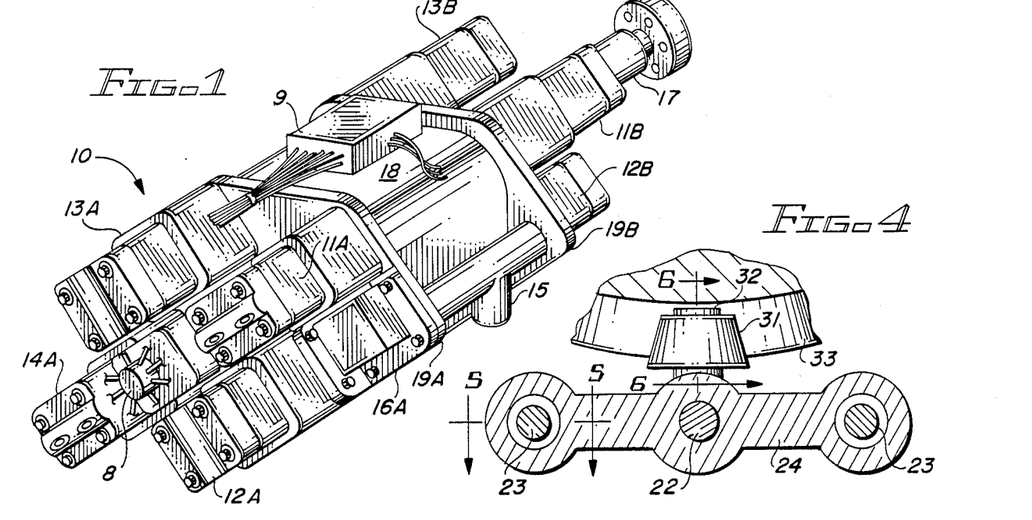
FIG. 1 is a perspective view of the internal combustion engine of the present invention.
FIG. 4 is a cross-sectional view of the carriage and a portion of the cam drum along the 4—4 plane of FIG. 3.

Referring first to FIG. 1, a perspective view of the internal combustion engine 10 is shown. Cylinders 11A, 12A, 13A and 14A, positioned on one end of engine 10, have symmetrically disposed cylinders 11B, 12B, 13B and 14B. Each group of cylinders is supported by support structures 19A and 19B respectively of the engine 10. Air inlet ports 16A and 16B provide air to cylinder pairs 11A and 12A, and 11B and 12B respectively. Air is supplied to air inlet ports 16A and 16B by air inlet pipe 15. A portion of the drive shaft 17 extends beyond the engine 10 and provides the rotational force to the propulsion mechanism. An engine casing 18 extends between support members 19A and 19B and encloses the cam drum and pistons and the apparatus for coupling the pistons to the cam drum. Timing member 9 is coupled to a cam drum (electronic) sensor and provides information with respect to the rotational position of the cam drum for controlling ignition within a cylinder. Fuel distribution apparatus 8 distributes the fuel to be injected into the cylinders.

Figure 2:
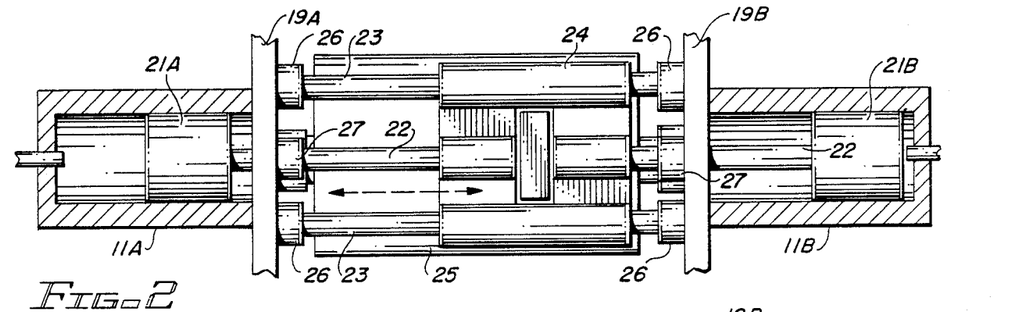
FIG. 2 shows a top view of a single cylinder pair of the internal combustion engine with the cylinders cut away to show the pistons.

Referring next to FIG. 2, a partially cut-away view of cylinder pair 11A and 11B is shown. The piston 21A of cylinder 11A and the piston 21B of cylinder 11B are rigidly coupled together by piston rod 22, causing the two pistons to move together in a horizontal direction. Rigidly attached to the piston rod 22 is carriage 24, the carriage 24 moving in response to the motion of the pistons 21A and 21B. The carriage 24 has its motion further determined by guide bars 23, the guide bars passing through apertures in the carriage. Fastening members 26 couple the guide rods to support structures 19A and 19B. Coupling members 27 position the piston rod 22 and permit motion of the piston while isolating the interior of the engine as determined by the support structures 19A and 19B and the engine casing 18 from the interior of the cylinders. The cam drum 25 is shown behind the carriage 24, guide rods 23 and piston rod 22.

Figure 3:
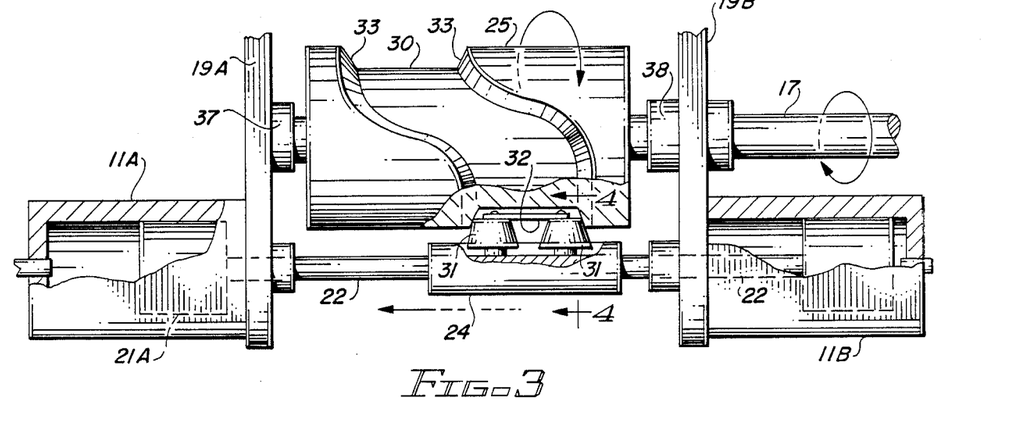
FIG. 3 is a side view of the cylinder pair of FIG. 2 illustrating the interaction of the carriage and the cam groove.

Referring next to FIG. 3, a partially cut-away view of the cylinder pair 11A and 11B and the cam drum 25 along the plane designated by the 3—3 arrows is shown. The piston rod 22 is shown connecting pistons 21A, 21B and the carriage 24, all members moving in unison. The drive shaft 17 passes through support structure 19B by means of bearing member 38. Bearing member 38 provides for the rotation of the drive shaft 17 while isolating the engine interior from the exterior region. Drive shaft 17 is coupled to cam drum 25. Cam drum 25 is positioned in a rotatable manner by bearing member 37. The cam drum 25 has a groove structure 30 with walls 33 fabricated therein that encircles the cam drum 25. The carriage 24 is positioned relative to the cam drum 25 so that two rotatable members 31, coupled to the carriage 24 extend into the cam drum groove 30. A retaining member 32 is coupled adjacent to the ends of the rotatable members 31 that extend into the cam groove 30.

Referring next to FIG. 4, a cross-sectional view indicated by the 4—4 plane designated in FIG. 3 is shown. The carriage 24 is shown in cross section, with the piston rod 22 and the guide rods 23 passing therethrough. The rotatable member 31 is coupled to the carriage and the support member 32 is coupled between the two rotatable members 31. The wall 33 of the cam groove 30 in the cam drum 25 is shown, indicating the relative position of the groove walls 33 and the rotatable members 31.

Figures 5, 6, 7, 9:
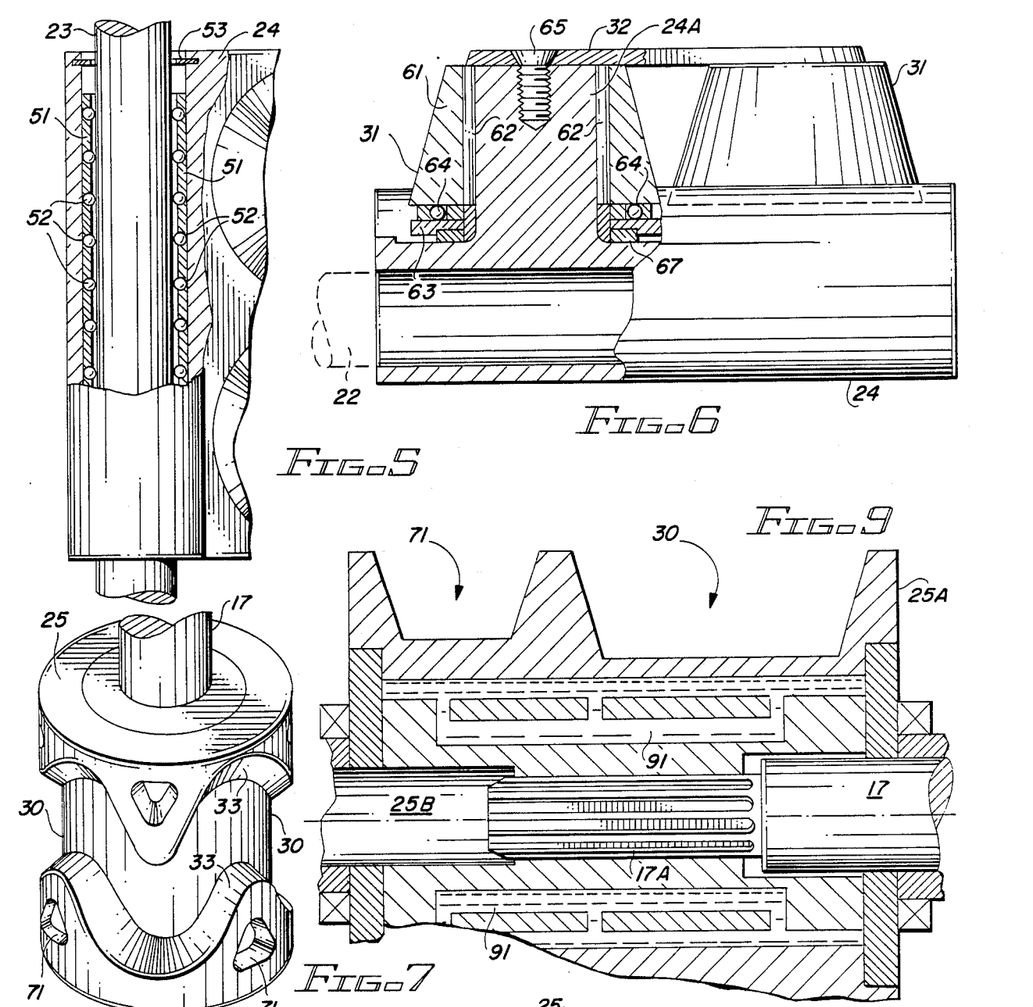
FIG. 5 is a partial cross-sectional view of the carriage and a guide rod indicated by the 5—5 plane of FIG. 4.
FIG. 6 is partial cross-sectional view of the rotating members of the carriage of the cylinder pair as viewed from the 6—6 plane of FIG. 4.
FIG. 7 is a perspective view of the cam drum of the internal combustion engine according to the present invention.
FIG. 9 is a cross-sectional view of the coupling of the drive shaft and the cam drum for the internal combustion engine.

Referring next to FIG. 5, a cross sectional view of the carriage along the plane designated by the 5—5 arrows of FIG. 4 is shown. This FIG. 5 illustrates the manner in which the guide rod(s) 23 are coupled to the carriage 24. The coupling technique involves a cylindrical member 51 that is in contact with the wall of the aperture in the carriage 24 through which the guide rods pass. The cylindrical member 51 has freely rotatable ball bearings 52 contained therein, or located in grooves as in other popular linear or rotating bearing, the ball bearings contacting the surface of the guide rod 23. The carriage 24 can move freely along the guide rod 23, the ball bearings permitting the motion while distributing the forces between the carriage and the guide rod 23. The end member 53 prevents the cylindrical member and ball bearings from exiting from the carriage aperture.

Referring next to FIG. 6, a cross sectional view of the carriage along the plane designated by the 6—6 arrows of FIG. 4. This FIG. 6 indicates the structure of the rotatable members 31. The actual rotation is preferably performed by a toroidal member having sloping external walls (being compatible with the slope of the cam groove wall 33). The interior of the toroidal member 61 is separated from a cylindrical shaped structure 24A in the carriage 24 by a multiplicity of cylindrical or tapered bearings 62. The cylindrical bearings 62 permits both the relative rotation of the toroidal member 61 and the cylindrical structure of the carriage 24A and the distribution of forces between these two members. If tapered bearings 62 are used, thrust bearings 64 may not be necessary. Ball bearings 64 in a containment structure or bearing race 63 permit the relative rotation of the base of the toroidal member 61 and the carriage, while distributing the forces between these members. Wave spring 67 is in contact with the bearing race 63 and the carriage 24. The support member 32 is coupled to the cylindrical structure(s) 24A of the carriage 24 by screw 65. The support member 32, when fastened with a screw to cylindrical member 24A, maintains the integrity of the toroidal member 61 and associated elements of the rotatable member 31. The piston rod 22 is shown passing through the carriage.

Referring to FIG. 7, the cam drum 25 is illustrated by a perspective view. The cam drum 25 is coupled to the drive shaft 17. The cam groove 30 has walls 33 and generally extends around the cam drum 25. Additional structures 71 can be removed from the cam drum 25 to reduce the amount of inertia or more dense matter can be added to the cam drum 25 for additional moment of inertia (i.e., to enhance the flywheel effect.)

Figure 8:
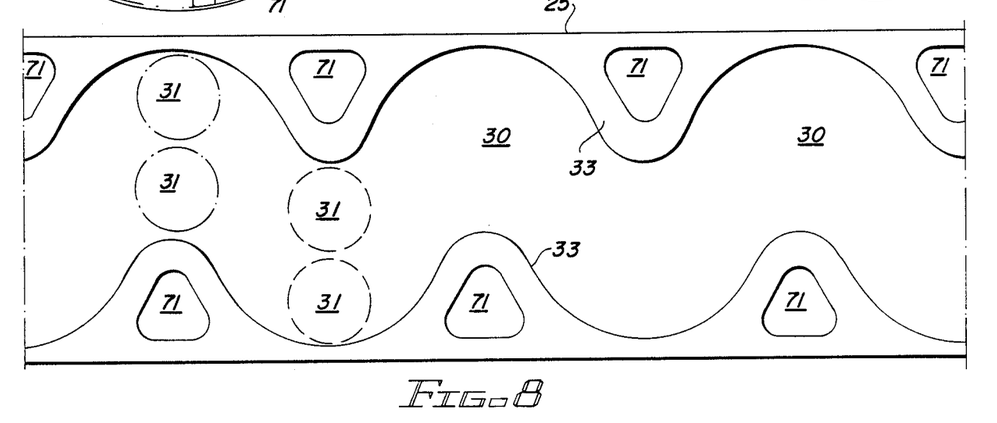
FIG. 8 illustrates the pattern of the cam drum groove in which the carriage moves.

Referring next to FIG. 8, the pattern of the cam groove 30 in the cam drum 25 is shown. The walls 33 of the cam groove are indicated as well as the structure 71. The position of the rotatable members 31 in the groove is illustrated at two positions by the dotted lines.

Referring to FIG. 9, the structure of the cam drum according to the preferred embodiment is shown. The drive shaft 17 has a spline structure 17A either fabricated thereon of coupled thereto. An interior portion 25B of the cam drum has a structure fabricated therein that permits coupling between the two members for transfer of torque. The exterior portion of the cam drum 25A has the cam groove 30 and the additional structures 71 fabricated therein. The interior portion of the cam drum 25B and the exterior portion of the cam drum 25A may be separated by an elastomeric body, damping particles or viscous material 91. The viscous material 91 has the property that the viscosity increases as the material 91 becomes warmer or the viscosity can be controlled by other techniques, such as magnetization of 25A and 25B and/or by the use of ferro fluids. These and related techniques are employed when damping of power impulses or vibrational damping is desired.

Figure 10A:
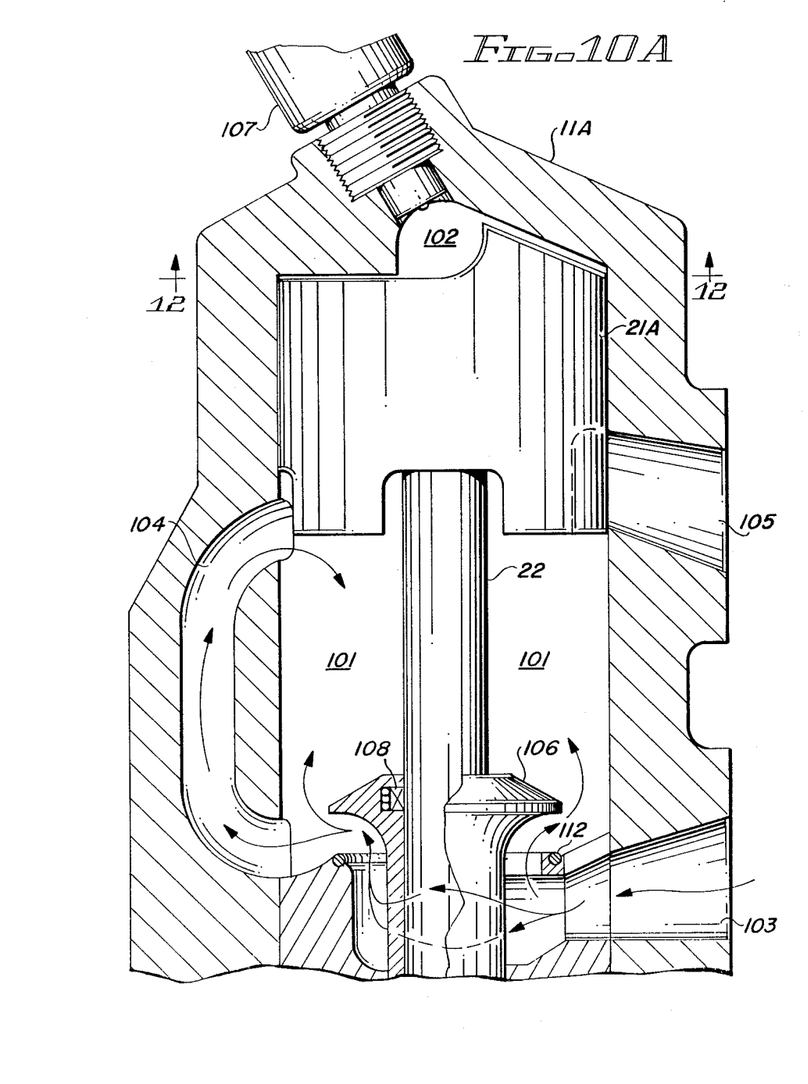
FIG. 10A shows a cross-sectional view of a cylinder at the end of the compression stroke.

Referring next to FIG. 10A, a detailed cross sectional view of the cylinder 11A when the piston 21A has reached the farthest extent of its travel (i.e., the piston 21A is at top dead center) is shown. The air is compressed into the combustion chamber 102 by the position of the piston 21A. The transfer passage 104 connecting the precompression chamber 101 with the combustion chamber 102 has been blocked by the upward movement of the piston 21A. The exit passage 105 from the combustion chamber 102 to the exterior of the engine 10 has also been blocked by the movement of the piston 21A, however, because of the relative positions of the port into the combustion chamber, at a later time than the transfer passage was blocked. After both passages are blocked, the air trapped in the combustion chamber 102 is compressed by the upward movement of the piston 21A. Intake air can be controlled by check valves or by the design of valve 106 which is preferably opened by the action of friction gland 108 in the intake valve and the piston rod 22. Intake valve 106 can also be opened and closed by the action of an electromagnetic or solenoidal clutch or other suitable apparatus. When the intake valve 106 is opened, air can pass through the intake passage 103 into the precompression chamber 101. This flow of air is augmented by the partial vacuum resulting from the upward movement of the piston 21A enlarging the precompression chamber 101. In the vicinity of top dead center position of FIG. 10A, a combination fuel injector and spark ignition mechanism 107 preferably introduces and ignites fuel as it is inserted into the combustion chamber 102. The combustion of fuel and air heats the gases in the combustion chamber, causing a force driving the piston to the position shown in FIG. 10B. According to another embodiment, mechanism 107 can be a normal fuel type injector and the compression ratio would be sufficient to produce compression ignition, and, in still another embodiment, the fuel air mixture can be ignited by operation of a conventional spark plug.

Figure 10B:
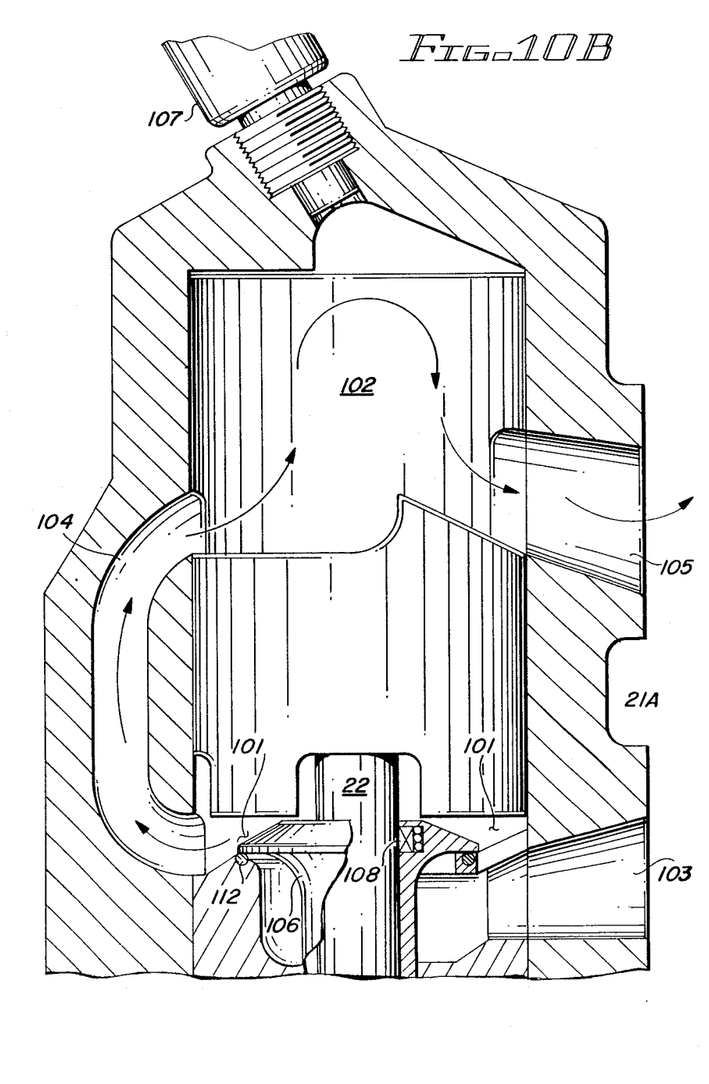
FIG. 10B shows a cross-section of a cylinder at the end of the power/air exchange stroke.

Referring to FIG. 10B, the position of the piston at the minimum point of its travel (i.e., bottom dead center) is shown. During the travel of the piston from the top dead center position (of FIG. 10A) to the bottom dead center position of FIG. 10B, the friction gland 108 causes the intake valve 106 to close preventing the air from entering through the intake passage 103 into the precompression chamber 101. The air trapped in the precompression chamber is compressed as the piston travels downward. At some point in the travel of the piston, the exit passage 105 is unblocked and the gaseous products of the combustion process can leave the combustion chamber. At a later point in the travel of the piston, the transfer passage 104 between the precompression chamber and the combustion chamber is opened and the air in the precompression chamber 101 replaces the air in the combustion chamber 102. The cycle can then repeat itself.

Figures 11A, 11B, 12, 13, 14, 15:
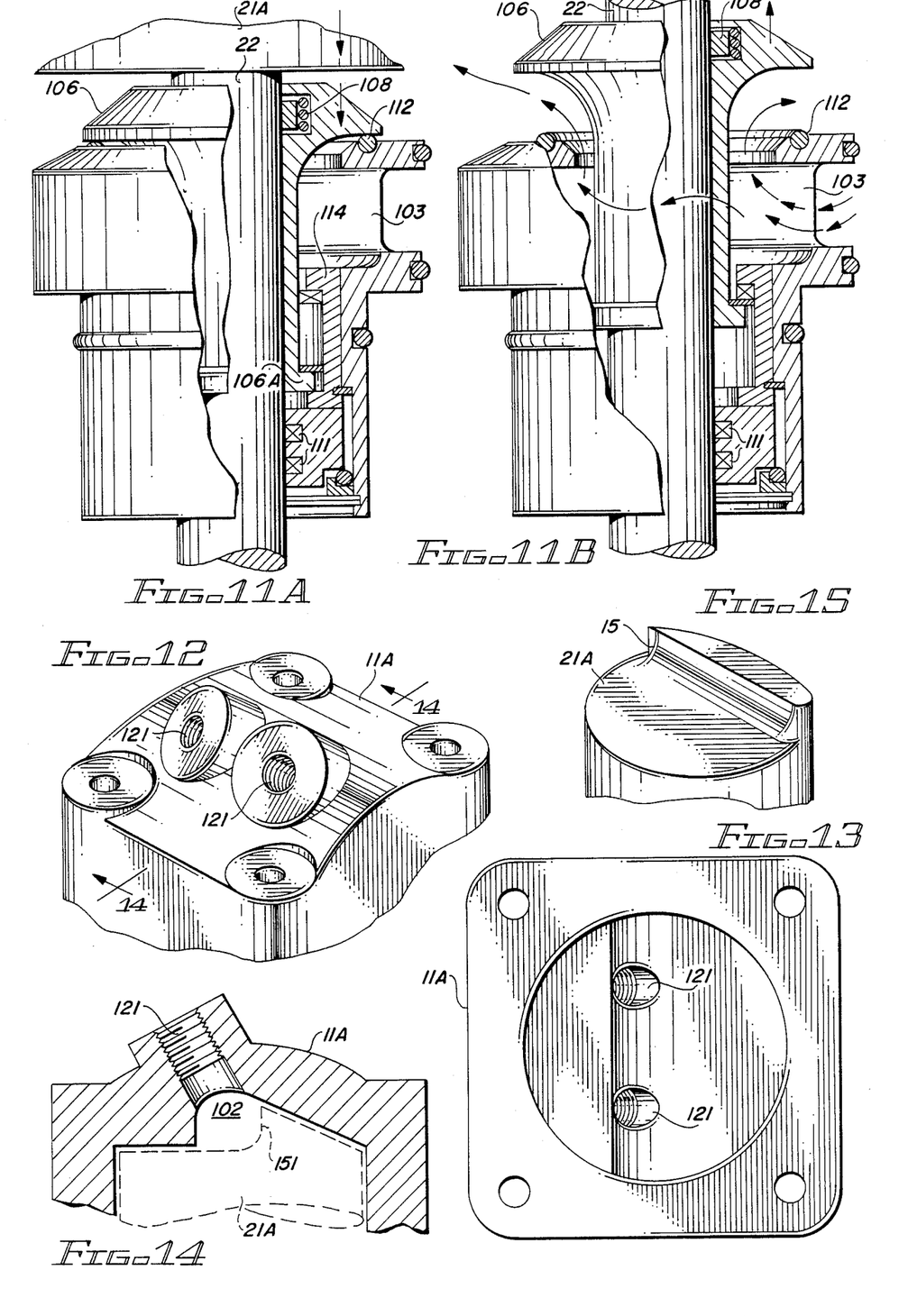
FIG. 11A illustrates the position of the intake valve to the precompression chamber during the power/air exchange stroke.
FIG. 11B illustrates the position of the intake valve during the compression stroke.
FIG. 12 is a perspective view of the top portion of a cylinder head according to the present invention.
FIG. 13 is an inside view of the cylinder head according to the present invention.
FIG. 14 is a cross-sectional view of the cylinder head on the 14—14 plane of FIG. 11.
FIG. 15 is a perspective view of the top portion of the piston according to the present invention.

Referring next to FIG. 11A and FIG. 11B, the intake valve and associated structures are shown for downward movement of the piston 21A and for upward movement of the piston 21A respectively. For the downward movement of piston 21A and the piston rod 22 in FIG. 11A, the friction gland 108 causes the intake valve 106 to be seated on a ring seal 112, effectively closing the precompression chamber to the further introduction of air through the intake passage 103. As shown in these Figures, in the preferred embodiment, the intake valve 106 has an aperture therethrough through which the piston rod 22 extends. The intake valve 106 has its travel limited in the downward direction by the ring seal 112 and associated structure and in the upward direction by the lip 106A at the bottom of the valve and the narrowed structure 114 of the lip passage. The sealing rings 111 provide a separation of the air and gases of the cylinder from the remainder of the engine. In FIG. 11B, the intake valve lip 106A is in contact with the narrowed passage structure 114, preventing further upward movement despite continuing force between the friction gland 108 and the piston rod 22. In this configuration, air can enter the precompression chamber 101 from intake port 103.

Referring next to FIG. 12, a perspective view of the top of the cylinder 11A is shown. Two ports 121 are fabricated in the cylinder to permit two fuel injector mechanisms (107 in FIG. 10A and 10B) to be introduced into the combustion chamber (102). Two ports are preferred for aircraft applications, while one port is preferred for automotive of auxiliary power engines.

Referring next to FIG. 13, a top view of the cylinder is shown along with the ports 121 that permit the fuel injector mechanism to be entered into the combustion chamber.

Referring next to FIG. 14 showing a cross sectional view of the top of the cylinder head 11A along with the cross sectional view of the piston 21A, the structure of the combustion chamber, when the piston 21A is at top dead center, is shown. The complimentary structure of the top of the cylinder and the top of the piston with structure 151 results in the compressed air being swirled generally in the vicinity of the fuel injection mechanisms 107.

Referring next to FIG. 15, the structure 151 on the top portion of the piston 21A is shown in a perspective view. This structure permits the air in the combustion chamber to be compressed in the immediate vicinity of the fuel injection mechanisms.

Figures 16, 17, 18:
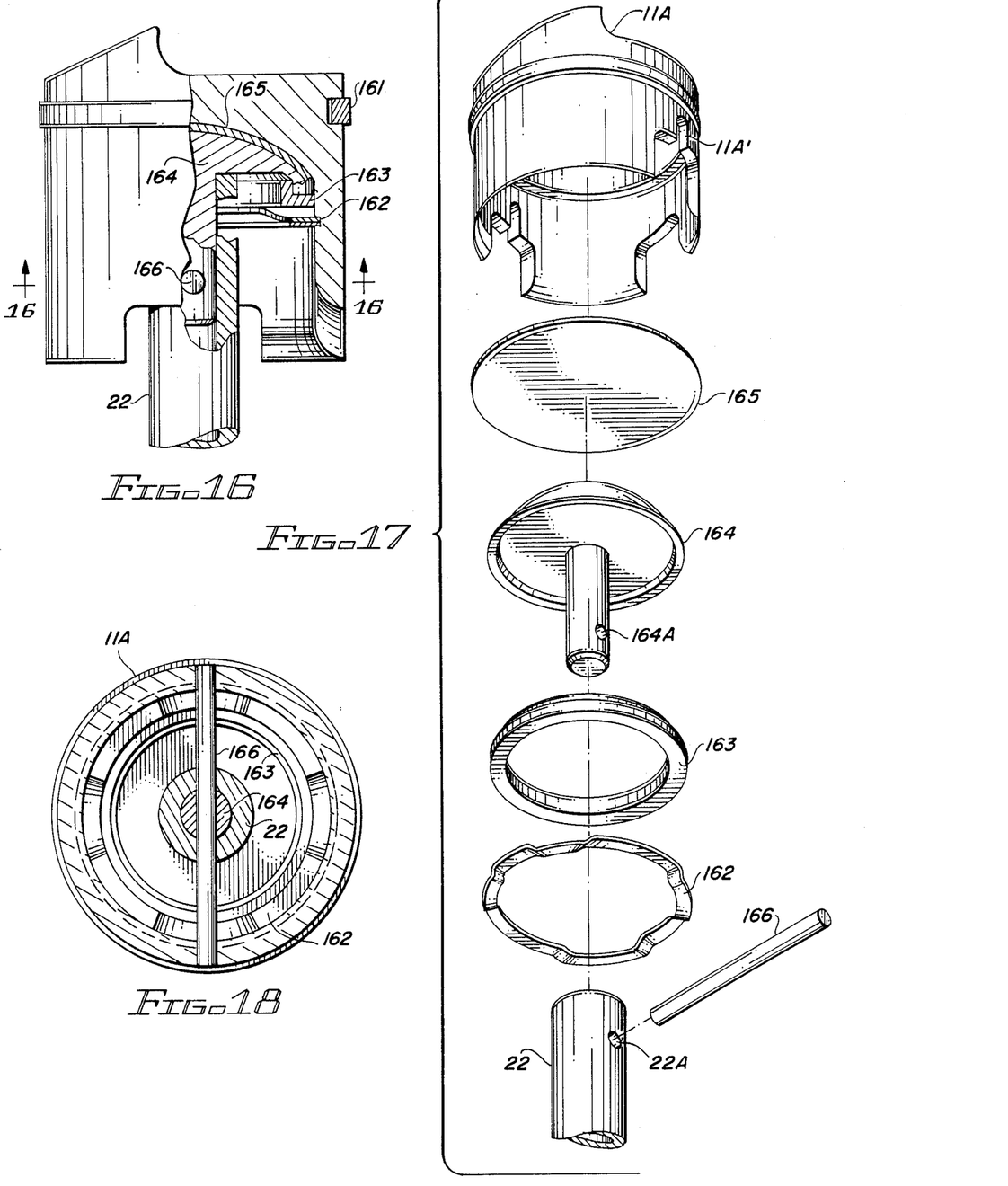
FIG. 16 is a partially cut-away view of the piston showing coupling of the piston to the piston rod.
FIG. 17 is an exploded view of the piston and associated apparatus illustrating the coupling of the piston to the piston rod.
FIG. 18 is a bottom view of the piston illustrating the position of the apparatus associated with the piston and the piston rod.

Referring next to FIG. 16, a preferred piston embodiment 11A is shown partially cut-away to illustrate the coupling of piston 11A to piston rod 22. The piston rod 22 is hollow permitting the stem of the piston rod head 164 to be inserted therein. Inserted between the piston rod head 164 and the top portion of the interior of the piston 11A is a ceramic gasket 165 for thermal insulation. An alignment ring 163 is positioned against the bottom of the piston rod head. The alignment ring 163 is in turn positioned against a wave spring. The wave spring is secured to the piston by being in a slot in the interior wall of the piston. Alignment pin 166 is inserted through apertures in the piston rod head and in the piston rod to secure these two elements in a predetermined relationship. The piston rings 161 are seated in a groove in the exterior wall of the piston.

Referring next to FIG. 17, the assembly of the piston and the associated elements is shown in an exploded view. The aperture 22A in the piston rod 22 and the aperture 164A in the piston rod head 164 have the alignment pin 166 inserted therethrough to couple these elements together. The ceramic thermal gasket 165 positioned between the top of the interior of the piston 11A and the piston rod head 164. The lower portion of the piston rod head 164 is positioned against the alignment ring 163. The alignment ring 163 is positioned against the wave spring 162 which in turn is coupled to a groove in the interior of the piston 11A. The piston rings 161 are secured in a groove in the exterior wall of the piston. The alignment pin 166 is seated in an antirotation groove 11A' in the base of the piston.

Referring next to FIG. 18, a bottom view of the piston and associated apparatus is shown. The alignment pin 166 passes through the stem of the piston rod head 164 and through the piston rod 22 by means of aperture 164A and 22A (shown in FIG. 17) respectively. The wave spring 162, the alignment ring 163 and the wall of the piston 11A can be seen from this view.

OPERATION OF THE PREFERRED EMBODIMENT

Referring once again to FIG. 1, each cylinder pair has a second cylinder pair positioned on the opposite (180°) side of the drive shaft. In the preferred embodiment, to counter the unbalanced forces in the engine and to provide smoother operation, the ignition of the gases in a combustion chamber 102 occurs simultaneously with the ignition of gases in the opposite cylinder pair and in the cylinder at the opposite end of the engine.

The pair of rotating elements 31, shown in FIG. 3 and FIG. 6, provides advantageous operation in the following manner. As the piston rods move back and forth as a result of combustion activity in the cylinders, the piston rods force the coupled carriage back and forth simultaneously. Because the rotating elements are located in the cam groove of the cam drum 25, the motion of the carriage transmits a force to the walls of the groove that results, because of the groove pattern, in a torque being applied to the cam drum 25 and consequently to the drive shaft. The torque results in rotation of the drive shaft. The tapering of the rotating elements provides for a distribution of the forces between the rotating elements and the cam groove wall. The tapering also reduces the criticality of the alignment between the rotating elements and the groove. The use of two rotating elements as opposed to one rotating element coupled to the carriage also reduces friction. For a single rotating element, when the contact changed from one side of the cam groove to the second side of the cam groove, the rotation would have to reverse resulting in increased friction and sliding as well as subjecting the rotating element to inertial forces. However, with two rotationg elements each element is in contact with only one side of the groove and the direction of rotation does not change during operation.

Referring once again to FIG. 10A and 10B, the operation of the cylinders can be understood as follows. When the piston 21A is in the vicinity of the top dead center position, the fuel injection mechanism 107 adds fuel and provides ignition to produce a pressure rise in the combustion chamber 102. The fuel and the air combine by means of a combustion process with a resultant increase in heat. The increase in heat in the combustion chamber 102 results in a rapid increase in pressure of the gases in the combustion chamber. A force is therefore exerted on the top of piston chamber 102, driving the piston away from the fuel injection mechanism 107.

While the piston is in the vicinity of the top dead center position of the cylinder, air can enter the lower cylinder precompression chamber 101 via air inlet pipe 15, air inlet chamber 16A and air intake passage 103 around open valve 106. The air also enters the transfer passage(s) 104, but is prevented from entering the combustion chamber because of the position of the piston 21A.

As the piston 21A travels away from the top dead center position, the friction gland 108 and/or the pressure in the precompression chamber (resulting from reduced volume and increased pressure in the chamber) forces valve 106 into a closed position. After the valve 106 closes, then further motion of the piston 21A causes a further increase in the pressure of the air in the precompression chamber 101 and in transfer passage 104.

Prior to reaching the bottom dead center position the exhaust passage 105 is exposed by the motion of the piston, and the products of the combustion process, under the influence of the elevated pressure of the gases in the combustion chamber 102, are ejected from the chamber.

Similarly, as the piston 21A continues to travel between the top dead center position and the bottom dead center position, the opening of the transfer passage 104 into the upper cylinder combustion chamber will be exposed and the air will be forced into the combustion chamber 102, driving the products of combustion from the chamber. As the piston continues the travel toward the bottom dead center position, the air in the precompression chamber will continue to be forced into the combustion chamber, so that the gas replacement does not have to rely on a partial vacuum at the exit passage to replace the gases within the combustion chamber with clean air.

After the piston 21A reaches the bottom dead center position and reverses the direction of travel, the valve 106, under the influence of the friction gland 108 or (when the transfer passage 104 is blocked) under the influence of the partial vacuum in the precompression chamber, will open permitting air to flow into the precompression chamber 101. As the piston 21A continues its travel toward the top dead center position, the outlet of the transfer passage 104 into the combustion chamber 102 will be blocked. The expanding volume of the precompression chamber will draw air into the chamber as a result of the partial vacuum. The motion of the piston 21A will block the exit passage 105. Thereafter, the motion of the piston 21A toward the top dead center position will compress the air in the combustion chamber in preparation for the combustion process to occur. It will be clear that the techniques generally referred to as supercharging and turbocharging can be utilized with the present invention to increase the quantity of air available for the combustion process.

The precompression chamber 101 serves another function. The pressure of the compressed air in the precompression chamber will provide a torque on the drive shaft that will help prevent the engine from stopping with a piston at the farthest extent of its travel (generally referred to as top dead center). The top dead center position is the position of quasi-equilibrium and an attempt to initiate rotation (without an auxiliary starting device) can be potentially damaging to the engine.

The timing for the ignition of the gases within the combustion chamber can be synchronized with the position of the cam drum, the cam grooves in the cam drum having a fixed relationship with the position of the cylinder rods. In the preferred embodiment, the timing is accomplished by a timing disc rigidly coupled to the cam drum and an electronic sensor. Some point on the timing disc can be used as a reference position (e.g. by a missing tooth in the gear) and the ignition of the fuel performed relative to the position of the reference disk position through the electronic sensor.

The combustion of fuel is accomplished, in the preferred embodiment, by the injection of fuel into the combustion chamber along with spark ignition of the stratified-charge fuel as it enters the combustion chamber. Such a combustion technique is described in U.S. Pats. Nos. 3,830,204; 3,980,061; and 4,436,058. By using the fuel injection and ignition of the fuel entering the combustion chamber, the engine of the present invention is able to be started without the use of an auxiliary starter motor. The ignited fuel is entered into combustion chambers that have progressed past the top dead center position, but have not progressed to the exhaust cycle. The pressure resulting from the heat generated in a chamber by the burning fuel can cause the cam to rotate. The next cylinders for which the pistons pass top dead center can have the fuel injected into the combustion chambers to increase the power. After the engine has reached the idle rotational velocity, the fuel-injection and spark-ignition can be optimized for fuel efficiency rather than initial operation.

In the preferred embodiment, an electronic processor 9 can be used to analyze and store information with respect to the piston locations for start-up operation and for continuous operation. The optimal timing of the fuel-injection and spark-ignition activity is developed empirically on a test stand and are available as subroutines for the processor. Instrumentation for sensing the piston positions can include optical, magnetic, mechanical, etc. encoders. When a piston 21A approaches the top dead center position during operational modes, fuel injection unit(s) 107 is actuated to inject and ignite the fuel in the combustion chamber. The timing of the start of the fuel injection, the duration of the injection period, and the ignition instant are controlled by a suitable subroutine to provide the greatest brake mean effective pressure or "B.M.E.P." per unit of heat released by the fuel. In the present embodiment, the requirement on the fuel is that it be spark-ignitable. Diesel fuel, jet-propulsion fuel, gasoline, propane, butane, fuel alcohols, methane and hydrogen can be utilized by the present invention.

It will be clear to those skilled in the art that the combustion can be accomplished by other techniques, such as compression ignition, the synchronized spark plug ignition of fuel and air introduced into the cylinder interior separately or in combination. In the description of the preferred embodiment, the cylinders were adapted to provide a two stroke mode of operation. This mode of operation has the advantage in the present invention that the power stroke of one cylinder directly performs the compression stroke of the associated cylinder. However, other modes of operation, such as the four stroke mode of operation, can be used in the configuration discussed above while still retaining many of the benefits of the present invention.

The foregoing description is included to illustrate the operation of the preferred embodiment and is not meant to limit the scope of the invention. The scope of the invention is to be limited only by the following claims. From the foregoing description, many variations will be apparent to those skiled in the art that would yet be encompassed by the spirit and scope of the invention.

What is claimed is:

1. An internal combustion engine comprising:
    at least one pair of cylinders, wherein piston rods from each of said cylinder pairs are coupled;
    a cam drum positioned generally parallel to each of said cylinder pairs, said cam drum having a cam groove, said groove encircling said cam drum in a predetermined path; and
    a roller mechanism coupled to each of said coupled piston rods, each of said cylinder pairs positioned relative to said cam drum so that said roller mechanism is in said groove, rotation of said cam drum being determined by motion of said roller mechanism in said predetermined path, wherein said roller mechanism has a separate rotating element for contacting each side of said groove.

2. The internal combustion engine of claim 1 wherein each of said cylinders has a lower cylinder precompression chamber associated therewith, flow of air into said precompression chamber and flow of air out of said precompression chamber being determined by a position of a cylinder piston in said cylinder.

3. The internal combustion engine of claim 1 comprising at least two cylinder pairs, said at least two cylinder pairs symmetrically disposed with respect to said cam drum, wherein cylinders on opposite ends of said symmetrically disposed cylinder pairs have a power stroke activated simultaneously.

4. The internal combustion engine of claim 3 wherein fuel is injected and spark ignited as a stratified charge within said cylinders during a last stage compression or during said power stroke of said engine.

5. The internal combustion engine of claim 4 wherein said cylinders are fabricated from a ceramic material, said engine operating without special cooling apparatus.

6. The internal combustion engine of claim 5 wherein said piston and said cylinder are shaped to form a generally cylindrical combustion chamber into which fuel is injected and ignited when said piston is in a top dead center position.

7. The internal combustion engine of claim 6 further comprising a drive shaft, said drive shaft coupled to said cam drum by means of a viscous material.

8. The internal combustion engine of claim 4 further comprising sensor means for determining an angular position of said cam groove, said sensor means controlling said fuel injection and ignition.

9. The internal combustion engine of claim 8 further comprising electronic means for starting engine.

10. The internal combustion engine of claim 1 further comprising an air intake valve having said piston rod passing through an aperture in said intake valve; and, a friction gland coupling said piston rod and said air intake valve.

11. The method of translating reciprocating motion of a rod into rotational motion of a cam drum and for translating rotational motion of said cam drum to reciprocating motion of said rod, said method comprising the steps of:
   constraining said cam drum to have only rotational motion, said cam drum having a groove fabricated therein;
   providing a carriage mechanism having at least two rotating members coupled thereto;
   constraining said rod to move with translational motion;
   coupling said carriage to said rod; and
   positioning said rod to provide that a first rotating member engages a first wall of said drum groove structure and that a second rotating member engages a second wall of said drum groove.

* * * * *